Dec. 27, 1966 R. E. STALCUP 3,295,107

ELECTRONIC TIME COMPRESSION DEVICE

Filed May 17, 1961 2 Sheets-Sheet 1

INVENTOR.
ROBERT E. STALCUP
BY
Lockwood Woodard Smith & Weikart
Attorneys

INVENTOR.
ROBERT E. STALCUP
BY
Lockwood Woodard Smith & Weikart
Attorneys

United States Patent Office 3,295,107

Patented Dec. 27, 1966

3,295,107

ELECTRONIC TIME COMPRESSION DEVICE

Robert E. Stalcup, Champaign, Ill., assignor to The Magnavox Company, Fort Wayne, Ind., a corporation Filed May 17, 1961, Ser. No. 110,734
10 Claims. (Cl. 340—172.5)

The present invention relates to an electronic time compression device, and more particularly to a new and novel electronic time compression device which utilizes permanent or semi-permanent storage elements for effectively performing frequency analysis as well as for computing correlation functions.

Time compression of an input signal is highly desirable in frequency analysis, which when effected on a real time basis, i.e. by scanning the signal in question by a narrow band filter, or by substituting a more narrow filter for improved resolution, presents the difficulties of (1) practical design limitations preventing a reduction of filter bandwidth below a certain range, thus limiting the resolution, and (2) the more narrow the filter, the longer it takes to scan through the frequency band of interest. In the latter case, it is evident that since only the instantaneous signal can be examined, only a fraction of the total signal can be utilized. In order to overcome this situation, it has become important to recreate the signal, spreading it over a wider frequency band, so that the aforesaid examining filter will not have to be of critical design, and, accordingly, time compression is important in accomplishing the preceding, i.e. in making the frequency band in question appear wider during analysis. In addition, a memory device must be employed to permit utilization of the complete signal being examined.

In addition, time compression plays an important part in generating auto-correlation and cross-correlation functions. For example, through time correlation, it is possible to find, as well as identify, a signal, notwithstanding the fact that the desired signal may be virtually an unintelligible part of noise or other unwanted signals. Although correlation techniques are known, the instant invention considerably shortens the time required for correlation in reference to corresponding real time. Additionally, and as will be fully developed herebelow, such prior correlation aproaches required more complex equipment than the instant invention and, hence, required more technical control for effective use.

Many approaches have been suggested for compressing a signal with reference to time, including, by way of example, a technique employing "scanned" magnetic type tape, where, typically, the output head of such system moves with reference to the moving magnetic tape. In such system the compression ratio is definable, broadly, as the relative velocity of the moving magnetic tape passing the moving output head divided by the relative velocity of the moving magnetic tape passing the stationary input head.

By way of further example, a so-called "deltic" or time delay line approach also represented means for compressing an input signal with reference to time. In this approach, a signal, delayed by reason of its passage through a time delay line, is fed from the output of the time delay line through a sampling clock and then stored in the time delay line, where, the compression ratio which is achieved is definable as the period of the sampling clock divided by the difference between the period of the sampling clock and the length of the delay line.

By virtue of the instant invention, the applicant has provided a new and novel time compression device employing permanent magnetic memories, as, for example, magnetic core memories, or semi-permanent storage memories, as a replacement for the aforesaid delay lines commonly found in devices performing similar functions. Broadly, the system includes transistorized digital circuitry which combines with the aforesaid permanent or semi-permanent memories to form an assembly which is optimum in size, weight, and volume, and which represents, as well, technical and economical advantages to the user. In contrast, many units of complex equipment were required by prior techniques to effect results which do not compare with those achieved by the instant invention.

Broadly, operational features provided by the applicant's new and novel magnetic time compression device include the sampling of an incoming signal at a fixed rate of a relatively long period of time, and the storage of such samples in a magnetic core memory, typically in the form of one or more planes, where, when the memory is full of sample signals, newly received information is accepted only in place of the oldest stored information. All of the information in storage is continually cycled through an output register in a given sequence and at a much higher rate than the original sampling rate. The stored information is assembled in serial form at the output register on a compressed time scale. In addition to the preceding, where multiple channels of time compression are employed, the contents of such respective channels may be multiplied with the contents of other of such channels and, further, the output of one channel may be delayed, in the matter of time, with reference to the output of other channels so that any pair of channels may be caused to operate as a correlation device.

Accordingly, a principal object of the present invention is to provide a new and novel time compression device for effectively performing frequency analysis as well as for computing correlation functions.

Another object of the present invention is to provide new and novel circuitry for the time compression of information utilizing permanent or semi-permanent memories and having a large capacity of loaded information as well as rapid internal access.

A further object of the present invention is to provide new and novel circuitry for magnetic time compression whereby stored information is continually cycled through the output means at a much higher rate than the original sampling rate of the stored information.

A still further and more general object of the present invention is to provide a new and novel electronic time compression device for producing a high speed replica of a long sample of a relatively low frequency signal and which, thereby, reduces the time required for correlation and/or frequency analysis of the aforesaid relatively low frequency signal.

Other objects and a better understanding of the invention will become more apparent from the following description, taken in conjunction with the accompanying drawings, wherein FIG. 1 is an analogue, in block form, of the theory underlying the loading operation for the applicant's new and novel time compression device;

Figures 1, 2:
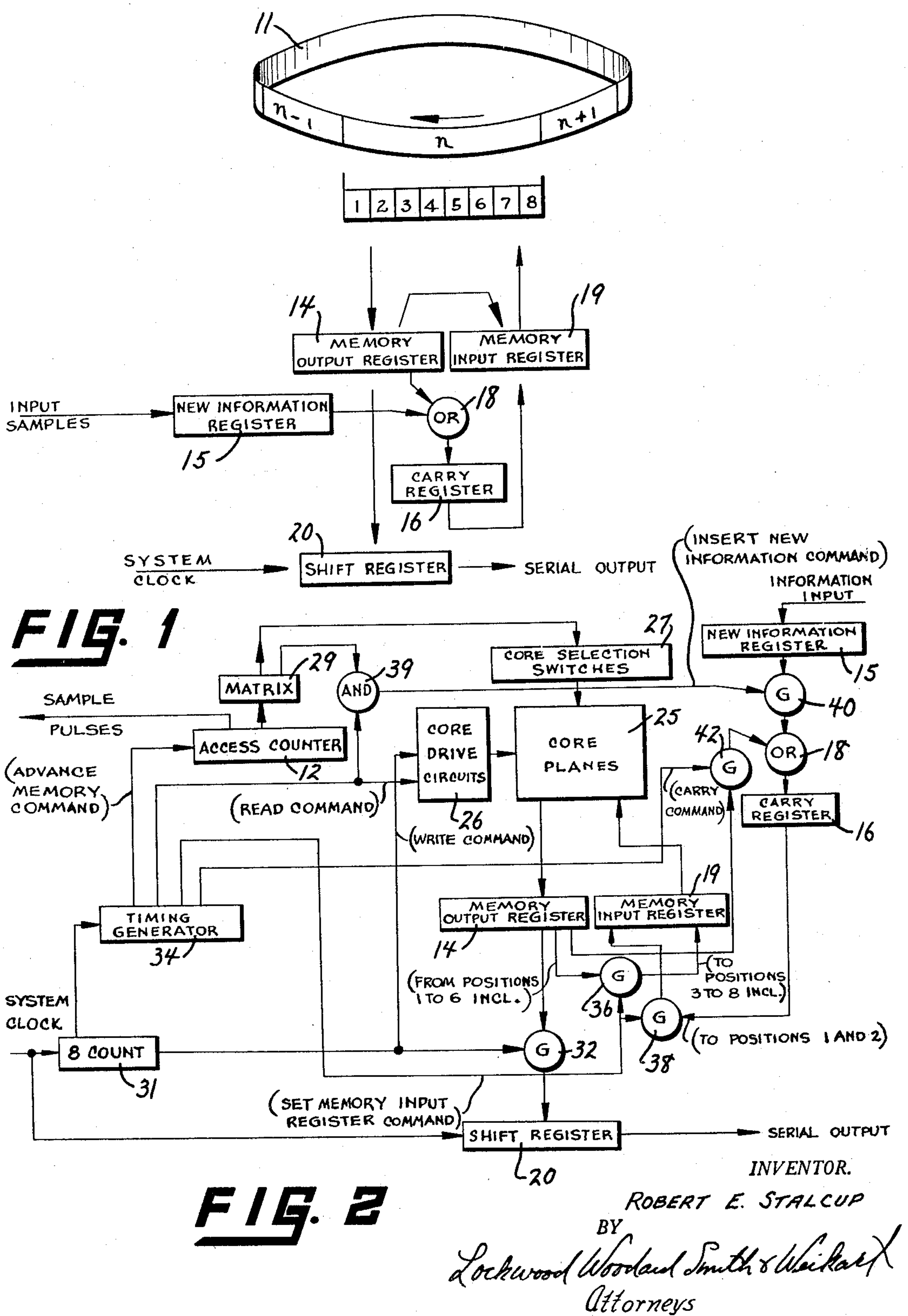
FIG. 2 is a block diagram of a typical time compressor channel embodying the loading operation disclosed by the analogue of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, in order to fully understand the principles underlying the instant invention, an analogue, in block form, is disclosed therein, in which an endless belt 11 is representative of the memory forming part of the device. In this latter regard, and by way of example, the memory actually and typically comprises one or more planes of magnetic cores, in this instance eight planes, where each plane includes eight rows of cores in one direction and sixteen rows of cores in another direction, all mounted within a frame. As memories of such type are known in the art, it is not believed necessary to be specific as to their structure; however, the cores are, in fact, magnetic ring-like members strung on wire junctions extending between the sides of the aforesaid frame. Although other semi-permanent storage devices may be used, such as capacitors, for example, the applicant preferably utilizes magnetic cores because of their inherent operational advantages, including reliability and the ability thereof to retain a signal until the latter is displaced by another signal introduced into storage.

In any event, the aforesaid endless belt 11 includes, in this instance, 128 word locations where any given word location "$n$" is divisible into eight access positions, i.e. each is representative of a particular magnetic storage device or core in the respective eight planes of the memory, forming, therefore, a total storage of 1,024 bits. Our example further identifies another of the word locations as "$n-1$," as well as still another word location as "$n+1$." Thus, for illustrative reasons, the applicant has arbitrarily depicted three consecutive word locations in a memory in physical sequence on the endless belt 11, and, it would follow that the number of planes in the memory determines the number of bits subject to access at each location. Moreover, and for further illustrative reasons, "$n$" will be defined herein as the index position for the system, i.e. the position at which new information may be cycled into the system. In regard to the latter, and rephrasing the proposition otherwise, new information is fed into the system at only one time, i.e. when all of the magnetic memories have been sequentially examined. As to the latter, an access counter 12, to be discussed in connection with FIG. 2, is provided so that the proper magnetic memory cores are chosen, in the same sequence, in all of the eight planes forming the memory of the illustrative example.

The analogue shown by the block diagram in FIG. 1 further includes a memory output register 14, a new information register 15 for receiving input signals, a carry register 16 for receiving information from the new information register 15 and from the memory output register 14 through an OR circuit 18, and a memory input register 19. A system clock, typically an oscillator having a fixed frequency, feeds the system, and a shift register 20 provides a serial output of the time compressed signal having the same rate as the frequency of the system clock.

Moreover, the input samples are divided down from the system clock, i.e. the latter periodically looks at the system clock signal and passes a sample bit to the new information register 15 until the latter is ready to be applied into the system at the index position "$n$." In the instant example, two bits are accumulated in the new information register 15 for subsequent acceptance into the system, but it should be understood that the actual number of sample bits is arbitrary, up to a number equal to the word length. It should be further understood that the memory output register 14, the new information register 15, the carry register 16, the input register 19, and the shift register 20 enumerated hereabove are flip-flop circuits, which, in themselves, are known in the art, and for this reason, require no specific discussion.

With the above basic information at hand, and considering that the endless belt 11 moves in the direction of the arrow on FIG. 1, the operational loading sequence is initiated, after a brief period devoted to settling of the system, by a read command pulse which transfers all of the bits representative of the access positions of a word location, i.e. of a particular magnetic core in each of the eight planes forming the memory, to the memory output register 14. It should be understood that all of the bits representative of the access positions are "read out," whether or not information is contained in each of the access positions.

Assuming now, for purposes of discussion, that the system is at the index position "$n$," i.e. new information can be cycled into the system, bits representative of the new information are copied from the new information register 15, through the OR circuit 18, and into the carry register 16, at an insert character command which may be made simultaneously with the aforesaid read command. In any event, the insert new character command and the read command occur prior to the time of the following described set input register command. When the preceding occurs, i.e. at the insert new character command, any old information in the carry register 16 is destroyed. It should be understood that use of the word "copy" herein implies that the information content of the register from which the copy is made is not altered.

Subsequently, at a set input register command, the bits in positions 1 to 6, inclusive, in the memory output register 14 are copied, in parallel, to the last six positions, i.e. positions 3 to 8, inclusive, in the memory input register 19, and the bits representative of the new information in the carry register 16 are copied, in parallel, into the first two positions, i.e. positions 1 and 2, in the memory input register 19.

At this time, and at a carry command, which may occur simultaneously with the set input register command or at any time thereafter to the earliest time of occurrence of either the next read command or the next insert new character command, the information at positions 7 and 8 of the memory output register 14 is copied, in parallel, into the carry register 16 through the OR circuit 18. The bits in each of the eight positions in the memory input register 19 are then stored, in parallel, and at a write command, in the cores defining the word location "$n$," and, simultaneously, the contents of the memory output register 14 is copied, in parallel, into the serial output shift register 20. The write command occurs after the set input register command and before an advance memory command (to be discussed herebelow).

It should be understood, therefore, that through the applicant's new and novel invention, as typically described herein, information in the various word locations ("$n$," "$n+x$") moves through the memory at a rate of two bits a time, and the bits in the last two positions of each word location are successively carried to the first two positions of the next word location of the endless belt 11. As the word location "$n$" is arbitrarily the position at which new information is to be accepted into the system, the last two bits of information at word location "$n-1$," i.e. those at positions 7 and 8, are the two oldest bits of information in the memory, and are subsequently replaced by the two bits of new information.

On the other hand, and as should be understood from the above, the bits of information in the last two positions of each word, i.e. positions 7 and 8, of the memory output register 14, are copied, at the aforesaid carry command, into the carry register 16, and are stored therein for use in the next word location, assuming the latter is not the index position "*n*," where, if so, they will be discarded.

When the contents of the memory input register 19 are stored in the word location "*n*" at the write command, the contents of the memory output register 14 is copied, in parallel, into the shift register 20, the latter being effected between system clock pulses. The system clock shifts the information through the shift register 20 and provides a serial output which, as indicated hereabove, is useful, for example, in frequency analysis, as well as for correlation purposes, the latter to be generally discussed herebelow. Bearing in mind that the time compression ratio is defined as the ratio of the system clock frequency, i.e. the rate at which the information is shifted out of the system, to the sample clock frequency, i.e. the rate at which the information is placed into storage, it should be understood that the applicant's new and novel time compression device provides a further advantage in having a single time base which can be sampled at many different rates to provide various time compression ratios.

While FIG. 1, described hereabove, shows the basic components which combine to form the applicant's new and novel time compression device, FIG. 2 is illustrative of a typical system utilizing the principles underlying the instant invention. In addition to those components described hereabove in connection with FIG. 1, viz., the memory output register 14, the new information register 15, the carry register 16, the OR circuit 18, and the shift register 20, the memory, in this instance, is defined as core planes 25, where the latter are the real equivalent to the analogous endless belt 11 of FIG. 1. The core planes 25 are driven by core drive circuits 26, and core selection switches 27, serve, as their name implies, to physically select the desired magnetic cores by reason of an advance memory command received through a matrix 29 and the access counter 12 from a timing generator 34. As should be understood from the preceding discussion, the combined access counter 12 and matrix 29 serve to control the memory location, i.e., provide sequential access to only one word location at a time, where the matrix 29 is typically a switch having, in our illustrative example, 128 positions.

The system clock forming the single time basis for the instant time compression device, typically a 500 kc./s. generator, for example, is followed by an eight bit counter 31, further identified in FIG. 2 as "8 count," which provides one output pulse for every eight pulses received from the system clock. Each pulse from the counter 31 operates eight parallel gating devices 32 which copy all information in the memory output register 14 into the shift register 20 at the end of the loading cycle for any given word location. Also on the write command, however, the information in the memory input register 19 is written, in parallel, into the core planes 25.

The pulse which is fed to the eight parallel gating circuits 32 through the counter 31 also serves to operate the aforedescribed access counter 12 and matrix 29 through an advance memory command from the timing generator 34. As discussed hereabove, the access counter 12 sequentially selects the desired magnetic cores in the memory planes, with the following pulse selecting the next succeeding eight magnetic cores, until all magnetic cores have been chosen, at which time the system cycles, the latter indicating that the contents of the entire memory have been reviewed.

The system further includes gating devices 36 and 38 which form a part of the circuitry for copying the bits of information in positions 1 to 6, inclusive, from the memory output register 14 to the last six positions, i.e., positions 3 to 8, inclusive, of the memory input register 19, and, at the same time, for copying the information in the carry register 16 into positions 1 and 2 in the memory input register 19, all of which occurs at the set memory input register command from the timing generator 34.

Additional circuitry, operable upon a carry command from the timing generator 34, effects transfer of the information in positions 7 and 8 in the memory output register 14 to the carry register 16 through gating device 42 and the OR circuit 18, where, as discussed hereabove, such information is stored until the next word location.

When the complete memory has been examined and the system is ready for new information, the timing generator 34 effects a new information command, where an AND circuit 39 and a gating device 40 are provided in the circuitry for the latter. As discussed hereabove, the input samples forming the information input to the new information register 15 are signals divided down from the system clock, and at the proper point in the programming cycle, governed by the AND circuit 39 and by the operation of the access counter 12 and the matrix 29, flow through gating device 40 and the OR circuit 18 into the carry register 16, and any old information in the latter is destroyed.

Supplemental to the above discussion, as well as to that in connection with FIG. 1, it should be apparent that the operational sequence of the applicant's new and novel time compression device is controlled through the timing generator 34, where the latter effectively commands (1) the choice and/or sequence, through the access counter 12 and the matrix 29, of the particular magnetic cores in the memory planes for examination; (2) the reading of information from the aforesaid selected magnetic cores to the memory output register 14; (3) the setting of the memory input register 19; (4) the carrying of the information in the last two positions in the memory output register 14 to the carry register 16; (5) the writing of the content of the memory input register 19 into the core planes 25, and the copying of the contents of the memory output register 14, through the gating devices 32, into the shift register 20; and, (6) where applicable, the entrance of a new character through the new information register 15, and associated circuitry, into the carry register 16.

In other words, the memory, in the illustration at hand, may be visualized as a 1,024 bit shift register which is shifted by two bit positions each time two new information bits are entered. At the time the new information is entered, the oldest two bits of information are discarded, but it should be understood that the information content of the memory may be sampled many times before the latter occurs, remembering that the number of such samplings is equal to the compression ratio.

Figure 3:
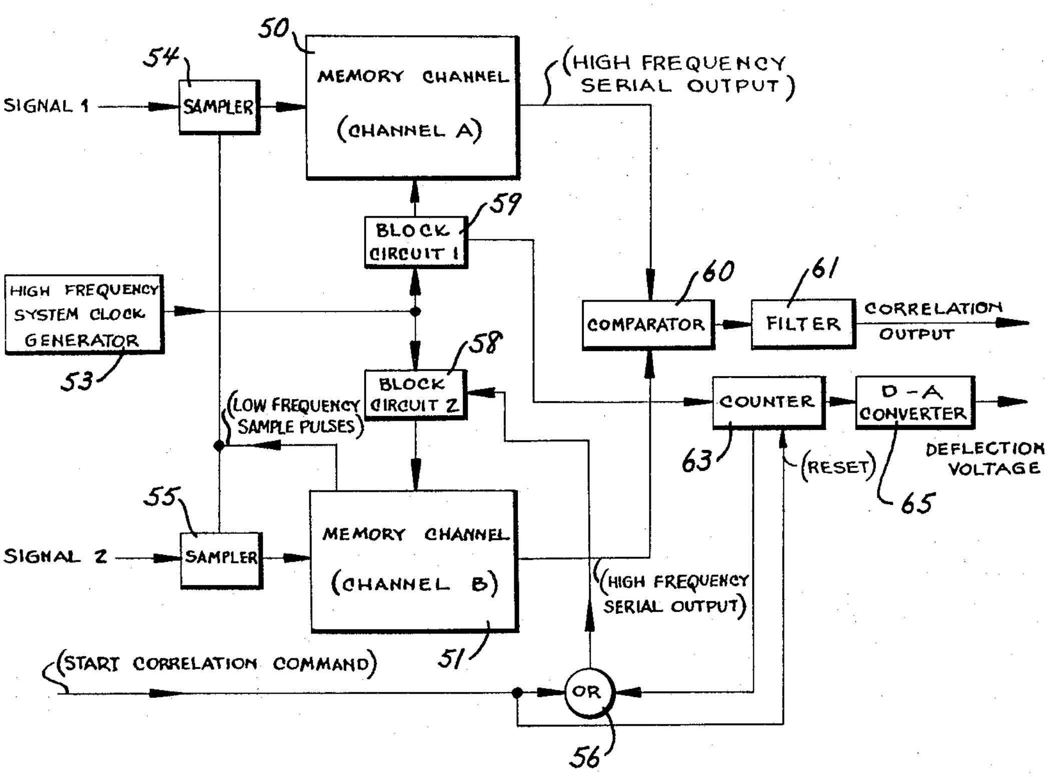
FIG. 3 is a block diagram of a correlation function generator utilizing two of the time compressor channels of FIG. 2; and, FIG. 4 is an analogue of the various memory locations of the two channels forming the correlation function generator of FIG. 3, where such memory locations are shown in an arbitrary position.
Figure 4:
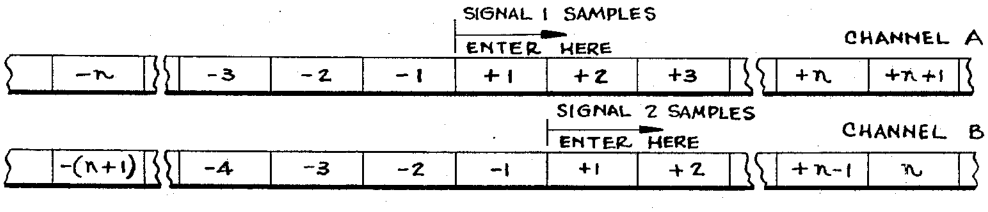

With reference now to FIGS. 3 and 4, and as briefly discussed hereabove, the applicant's new and novel time compression device affords particular advantages in the plotting of a correlation function, i.e. the finding and the identifying of information which is buried in noise or other unwanted signals. In this regard, the instant invention importantly provides a shorter correlation period than that available in any method of correlation now in use, and, additionally, considerably simplifies the equipment requirements for the user. Stated otherwise, while correlation plotting can be approached from a real time basis, usually a manual operation, a compressed time approach, such as available through the applicant's time compression device, permits the plotting of the correlation function in a shortened period of time.

In any event, the applicant's plotting of a correlation function is achieved by a bit by bit comparison of the serial output of memory channels 50 and 51, respectively responsive to an input signal 1 and an input signal 2 which are received therein through samplers 54 and 55, the latter typically being clipper amplifiers. It should be understood that the instant invention may employ any of several techniques for quantizing the input signal. For example, pulses may be stored which represent digit values of a binary number proportional to the amplitude of the signal at the time the sample is taken. Additionally, a delta modulation technique may be used, where, in such instance, at each sample instant, the amplitude of the signal is compared to the signal amplitude which existed at the previous sample instant.

The aforesaid memory channels 50 and 51 are respectively identified in FIG. 3 as channel A and channel B, and each are representative of the type of system described hereabove in connection with FIG. 2. In this instance, however, a high frequency system clock generator 53 provides a common signal source for both of the channels.

In further contrast, the memory channel 51, i.e. channel B, in a typical system, supplies the sample pulses for both channels A and B so as to retain sample coherence. In other words, instead of each of the memory channels functioning from independent sample pulses, as described hereabove in connection with FIGS. 1 and 2, a sample pulse is provided for both channels by memory channel B.

When an output signal appears from an OR circuit 56 responsive to a start correlation command, a block circuit 2, identified in FIG. 3 by reference numeral 58, inhibits the system clock input to memory channel 51 until memory channel 51 is caused to be delayed behind memory channel 50 by "$n$" consecutive bits, typically one-half of the number of bit locations in the memory cycle. Thereafter, the high frequency system clock input to memory channel 51 through block circuit 2 is enabled, and both channels are running once again, the latter occurring until another output signal appears from the OR circuit 56.

Following the above, each time the memory channel 50, channel A, makes a complete memory cycle, it is delayed by one bit. In order to accomplish the latter, the block circuit 1, identified in FIG. 3 by reference numeral 59, inhibits the system clock input to memory channel 50 for one pulse period after each complete memory cycle, until "$2n$" delays have resulted, at which time the memory channel 50 is delayed behind the memory channel 51 by "$n$" bits.

During the preceding operation, i.e. when block circuit 2 is inhibiting the system clock memory input to memory channel 51 for "$n$" consecutive pulses, and, thereafter, when memory channel 50 is being delayed one bit after each complete cycle through its memory until "$2n$" delays have resulted, the high frequency serial outputs of memory channels 50 and 51 are being compared bit by bit at a comparator 60. When a given pair of bits are identical in both channels, the comparator 60 registers "+1" correlation. On the other hand, when a pair of bits are unlike, the comparator registers "0" correlation, and a filter 61, into which the results of the comparator 60 is fed, averages these results of one complete cycle through the memory. In other words, correlation can be resolved by comparing the degree of serial output signal alignment from each of the memory channels.

The system also provides a deflection output which is proportioned to the state of a counter 63, where the latter serves to track the phase displacement between the information contained in the two memory channels 50 and 51. A combination of the correlation output and the deflection output yields a correlation output directly related to the phase displacement of the incoming signals of chanels A and B. A digital to analog converter 65 provides a ramp voltage output which may be used as a deflection voltage for a device, such as a recorder, which is to be used to display the correlation function. In this latter regard, the counter 63 typically resets upon receipt of a fly-back pulse from the display device. Alternately, for example, the counter 63 may advance until it resets itself, in which case the fly-back pulse is supplied by the counter 63, and the system is free-running.

FIG. 4, which corresponds closely with the discussion of FIG. 3, is an analogue of the memory bit locations, where the latter are shown in arbitrary positions. In this regard, the memory channel A is arbitrarily shown as delayed one bit behind the memory channel B. A bit by bit comparison may be made by vertical alignment, the latter showing bits "+1," "+2," "+3," "- - - +$n$" in memory channel A, respectively aligning with bits "—," "+1," "+2," ". . . +$n$−1" in memory channel B. It should be further understood from FIG. 4, that any new information being stored into memory channels 50 and 51 enters at bit position "+1," no matter what the relative phase relation of the two channels may be and, the information precesses, i.e. shifts, in the direction of the arrows in the figure.

Accordingly, as more and more of the bits in each of the memory channels come into agreement, i.e. are aligned with reference to each other by virtue of the forced phase shifting, a point of maximum correlation is finally attained, if indeed there is a correlation between the stored signals. Moreover, with the aforedescribed counter circuitry, the relative phase displacement of the signals applied to the memory channel inputs can be established.

The correlation function computer may also operate in a triangular manner rather than in the sawtooth manner, i.e. without a fly-back pulse. In a triangular sweep approach, memory channel A is delayed by one bit at a time until it is "$n$" bits behind memory channel B. Subsequently, memory channel B is delayed one bit at a time until it is "$n$" bits behind memory channel A, at which time the roles of the memory channels are again reversed. The reserval of the memory channels continues first once channel being delayed, then the other with all other features of the system remaining the same.

It should be apparent from the above discussion that the applicant has invented a new and novel time compression device which effectively provides a serial ouput which is very useful in the areas of frequency analysis and auto- and cross-correlation. The system provides an important contribution to the art in basing its operation on a single time base, which permits the ready variation of the time compression ratio by sampling the input signal at a different rate.

Further, it should be apparent that the applicant's new and novel time compression device is susceptible to various changes within the spirit of the invention. For example, and as noted hereabove, bi-stable devices, such as capacitors, may be used for the memory cores instead of the indicated permanent magnets. Additionally, the memory input register 19 and the memory output register 14 may be either separate or combined equipment, with the system operation being the same in either event. Thus, the above description should be considered illustrative, and not as limiting the scope of the following claims.

I claim:

1. In a time compression device, a single signal source, circuitry sampling said single signal source at pre-selected intervals, storage means coupled to said sampling circuitry and storing signals from said source sampled at various times within a plurality of said intervals, and reading means coupled to said storage means and controlled to read out all stored signals in a much shorter period of time than that encompassed by said plurality of intervals, the control of said reading means being independent of said sampling circuitry whereby said single signal source and said sampling circuitry are adapted to be varied to achieve various time compression ratios.

2. A time compression device comprising, in combination, a memory having a plurality of word locations, a first means receiving information read out of said memory at one of said word locations, a second means storing a portion of the information from said first means remaining from a word location preceding said one of said word locations, and a third means receiving a selected portion of the information from said first means and information from said second means, said second means being adapted to selectively receive new information stored in a fourth means, sampling means coupled to a source of signals being sampled, and said sampling means being coupled to said fourth means for admitting new information to storage in said fourth means, and control means coupled to said memory and to said sampling means and effecting word read out to said first means at a first rate and effecting new information insertion into said fourth means at a second rate much slower than said first rate.

3. A time compressor comprising:
a high frequency system clock signal source;
a sample clock signal source;
a stationary binary word organized memory having a plurality of word locations therein;
a timing generator coupled to said system clock;
an access counter coupled to said memory and to said system clock signal source and controlled to address various word locations in a predetermined sequence, and at a selected lower frequency than the frequency of signals from said system clock signal source;
an information signal input, and a new information register coupled through sampling means to said input for temporary storage of new information, said sampling means being coupled to and controlled by said sample clock signal source to store new information signals at times determined by pulses from said sample clock signal source;
a memory output register coupled to said memory to receive information read out of a memory address;
a memory input register coupled to said memory to store information to be written into a memory address;
a carry register;
first gate means coupled to said new information register and to said carry register and to said access counter and responsive to an insert new information command derived from said access counter and said timing generator to transfer new information from said new information register to said carry register;
second gate means coupled to said memory output register and to said memory input register and to said system clock signal source, and responsive to a signal derived from said system clock signal source to transfer a portion of the information in said memory output register to said memory input register;
third gate means coupled to said memory output register and to said carry register and to said system clock signal source, and responsive to a signal derived from said system clock source to transfer the remaining portion of the information in said memory output register to said carry register for normal reloading into another address of the memory or elimination from the time compressor upon displacement by new information at an insert new information command;
fourth gate means coupled to said carry register and to said memory input register and to said system clock signal source, and responsive to a signal derived from said system clock signal source to transfer information from said carry register to said memory input register;
a shift register;
fifth gate means coupled to said memory output register and to said shift register and to said system clock signal source and responsive to a signal derived from said system clock signal source to transfer information from said memory output register to said shift register, said shift register being connected to said system clock signal source and driven thereby to produce a serial output of information derived from said memory output register,
said sample clock signal source being coupled through said access counter and timing generator to said system clock signal source, and said access counter and timing generator dividing pulses derived from said system clock signal source to produce from a certain number of system clock pulses a number of sample clock pulses which is only a desired fraction of the number of system clock pulses, to provide whatever compression ratio is desired.

4. The time compressor of claim 3 wherein:
said timing generator is coupled to said system clock signal source through a counter producing one output pulse for a number of system clock pulses equal to the number of bit positions available in said memory for each memory word.

5. A correlator comprising:
first and second time compressors;
first and second information inputs for signals from first and second information signal sources, respectively;
a first sampler coupled between said first input and said first source;
a second sampler coupled between said second input and said second source;
a system clock driving both compressors;
a sample clock coupled to and controlling both samplers and effecting simultaneous sampling from both sources for coherence of information input samples to both compressors;
counter means effecting precession of one compressor with respect to the other compressor and producing an output in accordance with the total phase change between the compressors resulting from precession;
comparator means coupled to the outputs of both compressors to determine the degree of correlation therebetween;
filter means coupled to said comparator to produce an analog correlation output representative of the degree of correlation;
and digital to analog converter means coupled to said counter and producing a deflection voltage output representative of the phase difference between information producing the correlation output from the said filter means.

6. The correlator of claim 5 wherein:
said first and second time compressors each have a memory therein and means precessing information within the memory thereof.

7. In a time compression device, the combination comprising:
a memory including a plurality of word locations storing an input signal as it exists in real time for a period of time but in digital form;
a memory output register;
a memory input register;
a carry register;
and a shift register;
output means coupled to said shift register;
means reading all information from one of said word locations into said memory output register;
means copying into said memory input register a portion of said information in said memory output register and said copying means copying into said memory input register information in said carry register from a word location preceding said one of said word locations whereby a word is stored in said memory input register for insertion into said one word location and said word comprises a portion of the word previously stored in said one word location and a portion of the word previously stored in the said preceding word location;
means copying into said carry register the information in said memory output register which was not copied into said memory input register;
and means writing all information in said memory input register into said one of said word locations, said reading, copying and writing thereby effecting precession through said memory and occurring a plurality of times within a span of time equal in duration to said period of time;

and means copying said information in said memory output register into said shift register for shifting out through said output means whereby said stored input signal is presented in serial form at said output means a plurality of times within said span of time, and thereby on a compressed time scale.

8. The combination of claim 7 and further comprising:

a new information register;

and means operable simultaneously with the reading of all information from a certain word location into said memory output register to enter information from said new information register into said carry register to replace the information previously stored in said carry register from a word location preceding said certain word location, whereby said means copying into said memory input register during processing of said certain word location copies into said input register a portion of said information in said memory output register and the information entered in said carry register from said new information register, for updating the information stored in said memory.

9. The combination of claim 7 and further comprising:

a single signal source;

circuitry sampling said single signal source at preselected intervals;

said memory being coupled to said sampling circuitry and storing signals from said source sampled at various times within a plurality of said intervals;

said reading means being controlled to read out all stored signals in a much shorter period of time than that encompassed by said plurality of intervals, the control of said reading means being independent of said sampling circuitry whereby said single signal source and said sampling circuitry are adapted to be varied to achieve various time compression ratios.

10. In a correlation device, the combination comprising:

two memory channels including first and second time compressors and first and second information inputs for signals from first and second information signal sources, respectively;

a system clock driving both compressors;

correlation command and circuit means effecting precession of one compressor with respect to the other compressor and producing an output in accordance with the total phase change between the compressors resulting from precession, comparator means coupled to the outputs of both compressors to determine the degree of correlation therebetween;

means coupled to said comparator means to produce a correlation output representative of the degree of correlation therebetween;

and means continuously inserting new information from said sampling means into said two memory channels while correlating.

References Cited by the Examiner

UNITED STATES PATENTS

| | | | |
|---|---|---|---|
| 2,854,191 | 9/1958 | Raisbeck | 235—181 |
| 2,951,233 | 8/1960 | Tanco | 340—172.5 |
| 2,978,680 | 4/1961 | Schulte | 340—172.5 |
| 2,992,413 | 7/1961 | Adams et al. | 340—172.5 |
| 3,003,696 | 10/1961 | Tullos et al. | 235—181 |
| 3,009,106 | 11/1961 | Haase | 340—172.5 |
| 3,037,191 | 5/1962 | Crosby | 240—172.5 |
| 3,071,739 | 1/1963 | Runyon | 340—172.5 |

OTHER REFERENCES

Computer Logic, October 1960, Flores, Prentice-Hall, pp. 149, 168–169 and 295.

ROBERT C. BAILEY, *Primary Examiner.*

MALCOLM A. MORRISON, *Examiner.*

M. LISS, W. M. BECKER, L. W. MASSEY, *Assistant Examiners.*